W. A. PARKER.
DISK FENDER.
APPLICATION FILED JUNE 12, 1911.
1,006,002.
Patented Oct. 17, 1911.
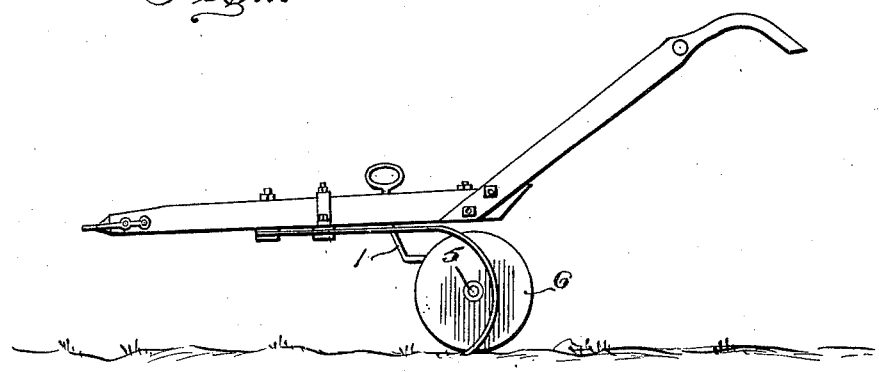
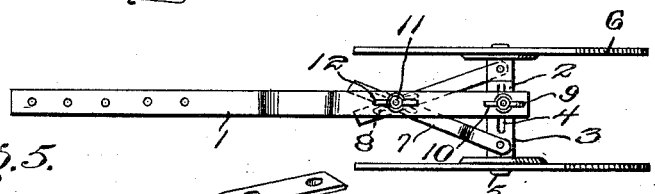
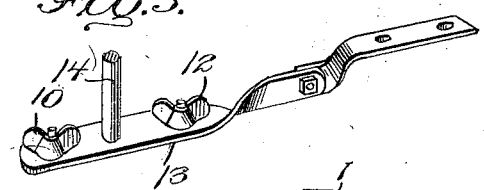
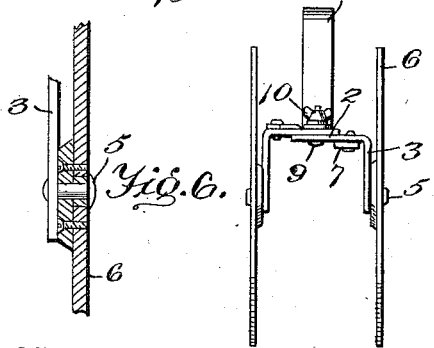
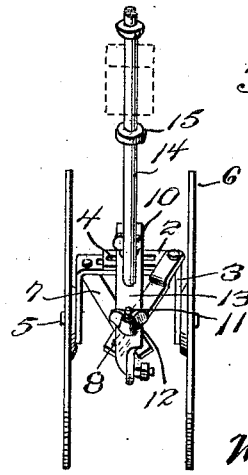
Witnesses
Inventor
W. A. Parker
By
Attorneys.
COLUMBIA PLANOGRAPH CO., WASHINGTON, D. C.

UNITED STATES PATENT OFFICE.

WILLIAM A. PARKER, OF ATLANTA, GEORGIA, ASSIGNOR TO BECK & GREGG HARDWARE CO., OF ATLANTA, GEORGIA.

DISK FENDER.

1,006,002.  Specification of Letters Patent.  Patented Oct. 17, 1911.

Application filed June 12, 1911. Serial No. 632,743.

*To all whom it may concern:*

Be it known that I, WILLIAM A. PARKER, citizen of the United States, residing at Atlanta, in the county of Fulton and State of Georgia, have invented certain new and useful Improvements in Disk Fenders, of which the following is a specification.

This invention has relation to disk fender attachments for cultivators, and has for its object to provide a simple structure adapted to be so connected with the beam of a cultivator that it may float over the surface of the soil as the cultivator moves.

With this object in view the attachment consists of a draft arm to which are attached frames adapted to be adjusted transversely of the said arm. Means are provided for securing the said frames in adjusted positions. The frames carry gudgeons upon which flat disks are journaled. Thus it is possible to move the disks toward or away from each other to increase or diminish the space between them and it is possible to pitch the disks at angles with relation to each other so that they may cast the soil toward each other or away from each other as desired.

In the accompanying drawing Figure 1 is a side elevation of the fender applied to a cultivator; Fig. 2 is a top plan view of the fender; Fig. 3 is a rear elevation of the same; Fig. 4 is a perspective view of the fender showing a modified form of draft arm attached thereto and with part removed; Fig. 5 is a perspective view of the modified form of draft arm; and Fig. 6 is a sectional view of the central portion of one of the fender disks and its hub.

Corresponding and like parts are referred to in the following description and indicated in all the views of the accompanying drawing by the same reference characters.

In one form of the invention the fender includes a resilient draft arm 1 which is adapted to be connected with the beam of a cultivator in any suitable manner. An arched frame 2 is connected with the rear portion of the arm 1 and consists of side sections each including a strip 3 having angularly disposed end portions and provided at their upper end portions with elongated slots 4. Gudgeons 5 are carried at the lower portions of the strips 3 and flat disks 6 are journaled for free rotation upon the said gudgeons. Brace pieces 7 are pivotally connected at their rear ends with the upper outer portions of the strips 3 and are provided at their forward ends with elongated slots 8. A bolt 9 passes transversely through the rear portion of the arm 1 and through the slots 4 of the strips 3 and is provided with a wing nut 10 which is screw threaded thereon. A bolt 11 passes transversely through the rear end portion of the arm 1 in advance of the bolt 9 and also passes through the slots 8 in the brace pieces 7. A wing nut 12 is threaded upon the upper end of the bolt 11. Therefore it will be seen that by loosening the nuts 10 and 12 the strips 3 may be shifted laterally of the arm 1 with relation to each other so that the disks 6 may be positioned toward or away from each other. When the disks are properly positioned they are held by tightening the nuts 10 and 12. The disks may be positioned in parallel relation to each other or may converge toward each other at their forward or rear edge portions as desired. When the disks are not parallel they are so positioned as to cast the soil toward each other or away from each other according to the relative position of their rear or forward edge portions.

If desired the spring arm 1 may be dispensed with and an arm made up of sections pivotally connected together may be substituted therefor. Such an arm is illustrated at 13 and when this arm is employed a rod 14 is fixed at its lower end to the rearmost section and extends up and is slidably received in the vertical opening provided in the beam of the cultivator. Sliding movement of the rod 14 is limited by shoulders 15 mounted thereon and thus the rear section of the arm 13 may have limited vertical swinging movement, but by reason of the rigidity of the rod 14 the rear arm section cannot swing laterally.

Having thus described the invention, what is claimed as new is:

A fender comprising a draft arm, a frame carried at the rear portion thereof and consisting of frame sections each including a strip having angular end portions, the upper portions of the strips having elongated slots, a bolt passing through the arm and through said slots, braces pivoted at their rear ends to the upper outer portions of the strips and provided at their forward portions with slots, a bolt passing through the arm and through the slots of the braces, gudgeons located at the outer portions of the frame sections, and disks journaled for rotation upon the gudgeons.

In testimony whereof, I affix my signature in presence of two witnesses.

WILLIAM A. PARKER. [L. S.]

Witnesses:
H. C. BUCHANAN,
M. T. BURKE.

Copies of this patent may be obtained for five cents each, by addressing the "Commissioner of Patents, Washington, D. C."